United States Patent [19]
Arai
[11] 4,234,524
[45] Nov. 18, 1980

[54] IDLE ADJUSTING SCREW IN CARBURETOR

[75] Inventor: Hisaharu Arai, Nagoya, Japan
[73] Assignee: Aisan Industry Co., Ltd., Aichi, Japan

[21] Appl. No.: 33,665
[22] Filed: Apr. 26, 1979
[30] Foreign Application Priority Data
May 9, 1978 [JP] Japan .................................. 53/54603
[51] Int. Cl.3 .............................................. F02M 3/08
[52] U.S. Cl. ................................ 261/41 D; 137/384; 137/382.5; 251/278; 251/DIG. 4; 261/DIG. 38
[58] Field of Search ................. 251/276, 278, DIG. 4; 137/382.5; 261/41 D, DIG. 38; 137/384

[56] References Cited

U.S. PATENT DOCUMENTS

| | | | |
|---|---|---|---|
| 51,349 | 12/1865 | Powell | 137/382.5 |
| 2,033,371 | 3/1936 | Benaggio | 261/DIG. 38 |
| 3,453,655 | 7/1969 | Quinones et al. | 137/382.5 |
| 3,454,264 | 7/1969 | Sarto | 261/DIG. 38 |
| 4,087,492 | 5/1978 | Onishi et al. | 261/41 D |
| 4,097,561 | 6/1978 | Seki et al. | 261/DIG. 38 |
| 4,120,918 | 10/1978 | Codling | 261/DIG. 38 |

FOREIGN PATENT DOCUMENTS

| | | | |
|---|---|---|---|
| 968332 | 5/1975 | Canada | 251/DIG. 4 |
| 378574 | 7/1923 | Fed. Rep. of Germany | 261/41 D |
| 522322 | 4/1931 | Fed. Rep. of Germany | 261/41 D |
| 1924733 | 1/1970 | Fed. Rep. of Germany | 261/41 D |
| 613440 | 4/1926 | France | 261/41 D |

*Primary Examiner*—Tim R. Miles

[57] ABSTRACT

A mixture adjusting screw in a carburetor for regulating the fuel efflux during engine idling is provided in which the end needle portion of the screw is located in the idle port of the carburetor and a spring is loaded around the rod portion of the screw to hold the screw in position after adjustment so as to maintain its proper adjustment. The screw head is covered by a plug and it is specifically shaped to inhibit easy access of the user to the screw for adjustment purposes. The air and fuel mixture formed in the low-load fuel system in the carburetor is well stirred due to the presence of the spring which is exposed to a fuel passage and is formed into an emulsion flow, allowing stabilized rotation of the engine during idling and high performance thereof in normal running.

6 Claims, 3 Drawing Figures 9 2 6 8" 7 8 1 3 12 10 11 9 4 5 8' 1'

FIG. 1
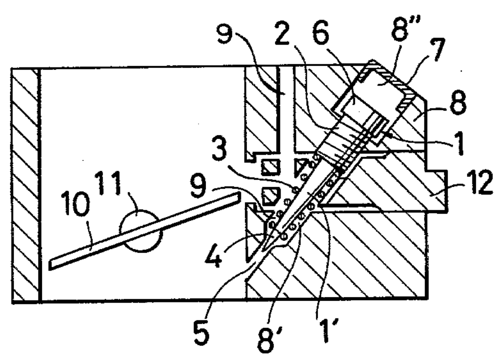
FIG. 2
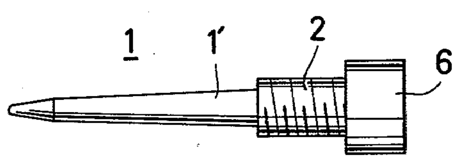
FIG. 3A
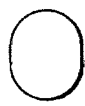
FIG. 3B

IDLE ADJUSTING SCREW IN CARBURETOR

FIELD OF THE INVENTION

This invention relates to a novel construction of a mixture adjusting screw in carburetors for regulating the fuel charge during idling of the engine.

BACKGROUND OF THE INVENTION

The conventional mixture adjusting screw was so designed that it can be freely adjusted by the user even after the carburetor has been mounted in position in the engine, so that there was a risk that the screw would be improperly readjusted by the user to cause a change in the fuel efflux during idling and a corresponding change in the exhaust gas emission even beyond the level regulated by the law. Therefore, it is desirable to design the mixture adjusting screw such that it can not be randomly adjusted by the user once it has been properly adjusted by the maker.

SUMMARY OF THE INVENTION

The present invention is to provide a mixture adjusting screw which is so constructed that it can not be adjusted by the user but which has no greater difficulty for adjustment for the maker as compared with the conventional screw. Namely, in an idle adjusting screw device for carburetors, having a mixture adjusting screw fitted into a carburetor body such that a needle portion at the forward end section of the screw is disposed in an idle port of the carburetor body, an improvement which comprises a screw (1) consisting of a head portion (6), a threaded portion (2), a rod portion (1'), and a needle portion (4); a carburetor body (8) having a cavity (8"), an insertion hole (8') with which a fuel passage (9) is communicated at an acute angle, and an idle port (5), all of which are formed integrally such that the axis common thereto is inclined, the screw (1) being fitted into the carburetor body such that the needle portion (4), rod portion (1'), and the head portion (6) are positioned in the idle port (5), insertion hole (8'), and cavity (8"), respectively; a coil spring (3) which is provided around the rod portion (1') so as to urge the screw (1) counter to the screw inserting direction and which is exposed to the fuel passage; and a detachable plug fitted into an outer end portion of the carity (8") so as to cover the head portion (6), which head portion of the screw is specially shaped so that the screw (1) cannot be turned with an ordinary tool, the plug and the specially-shaped head portion (6) constituting double means for preventing random operation of the screw.

BRIEF DESCRIPTION OF THE DRAWINGS

FIG. 1 is a vertical sectional view of an embodiment of this invention;

FIG. 2 is a front view of the screw; and

FIGS. 3A and 3B show shapes of the screw head.

DESCRIPTION OF THE PREFERRED EMBODIMENTS

Referring to FIG. 1, it will be seen that a spring 3 is coiled around the rod portion 1' below the threaded portion 2 of the screw 1, with one end of said spring 3 being pressed against the lower end face of the threaded portion 2 while the other end being secured against the lower end of the rod portion insertion hole 8' so that the spring is held in a compressed state. Thus, the spring 3 forces the screw toward its threaded portion 2 to secure it against loosening and to prevent any inadvertent rotation of the screw due to engine vibration or other external forces. The spring 3 is exposed to the fuel passage. The foremost end of the screw 1 terminates into a sharp needle 4 which is moved forwardly or reawardly in accordance with the screw rotation to change the open area of the idle port 5 to thereby adjust the fuel flow rate.

The head portion 6 of the screw 1 is sunken in a cavity 8" formed in the carburetor body 8 so that the head portion does not project outside of the carburetor body. A plug 7 is driven into the peripheral edge of the cavity 8" and secured in position so as to cover the screw head.

The plug 7 is firmly fixed so that it cannot be removed without using a specific tool. The head portion of the screw 1 may be of an elliptical or irregularly polygonal shape as shown in FIG. 3A or 3B so that the screw 1 cannot be turned by any tool except a specially prepared manufacturer's tool. A throttle valve 10 is shown with a throttle valve stem 11. A throw port plug 12 is provided in a channel in the carburetor body 8 leading to the screw 1.

After proper adjustment of the screw 1 at the manufacturer's factory, the plug 7 is mounted and secured in position to inhibit any random readjustment of the screw, but if the screw head is specifically formed so that it cannot be turned without using a specific tool possessed only by the maker, the intended end can be fulfilled even if the plug should be removed. Since the object of the invention can be achieved even when the plug has been removed, the provision of a combination of the plug and specially-formed head portion serves to produce an excellent effect.

Thus, according to this invention, the screw adjustment can be as easily accomplished by the maker as with the conventional screw, and after the adjustment, the screw is securely held in position by a spring to maintain its proper adjustment. Moreover, due to a double prevention means consisting of the plug 7 covering the head portion of the screw and the specially-formed head portion of the screw, the screw cannot be adjusted by the user. Further, since the spring 3 is exposed to the fuel passage 9, the air and fuel mixture formed in the low load fuel system in the carburetor is well stirred up and allowed to run out from the idle port 5 in the form of an emulsion flow, so that the engine rotation during idling is stabilized and also the engine performance is improved in normal running.

What is claimed is:

1. In an idle adjusting screw device for carburetors having a mixture adjusting screw fitted into a carburetor body such that a needle portion at the forward end section of the screw is in an idle port of the carburetor body, the improvement wherein the screw consists of:

- an enlarged head portion,
- a rod portion having a smaller diameter than that of said head portion,
- a threaded portion connected to and between said head portion and said rod portion and having a diameter intermediate to that of said head portion and that of said rod portion,
- said threaded portion forming a lower end step surface connecting said rod portion, and
- a needle portion narrowing from a bottom free end of said rod portion;

a carburetor body defining:
- an intake passage,
- a cavity having an outer free end portion,
- an elongated insertion hole,
- a threaded bore connected between said insertion hole and said cavity,
- a fuel passage directly communicating with said insertion hole at an intermediate portion of the latter and at an acute angle relative thereto, and
- an idle port communicating with a free end of said insertion hole and said intake passage, said cavity, said insertion hole, said threaded bore and said idle port are integrally formed in said carburetor body and are aligned defining an inclined common axis, said screw is fitted into said carburetor body such that said needle portion extends into said idle port, said rod portion extends in said insertion hole, said threaded portion engages in said threaded bore, and said head portion is positioned completely disposed inside of said cavity spaced from said outer free end portion, said insertion hole has a lower end narrowing surface connecting said insertion hole with said idle port, a coil compression spring is disposed around said rod portion in said insertion hole engaging said step surface of said threaded portion and said narrowing surface of said insertion hole so as to urge said screw in a direction counter to a screw insertion direction, said spring being exposed to said fuel passage, a detachable closed plug fitted in said outer free end portion of said cavity extending solely into said cavity so as to cover said head portion of said screw, said head portion has a special shape constituting means for permitting said screw to be turned only with a specially correspondingly shaped tool, said plug and said special shape head portion constituting double means for preventing random turning of said screw.

2. The idle adjusting screw device as set forth in claim 1, wherein said rod portion has a largest diameter adjacent said step surface and tapers continuously therefrom in a direction toward said free end thereof, said coil compression spring huggingly engages said rod portion throughout the entire length of said spring and of said rod portion tapering in a direction toward said idle port.

3. The idle adjusting screw device as set forth in claim 2, wherein said cavity has an inner peripheral wall having a diameter substantially equal to a diameter of said enlarged head, the latter being spaced only by a small gap from said inner peripheral wall of said cavity.

4. The idle adjusting screw device as set forth in claim 3, wherein said rod portion, said threaded portion, said head portion and said needle portion, each respectively in the order named has relatively smaller axial lengths.

5. The idle adjusting screw device as set forth in claim 4, wherein said threaded portion is extendable simultaneously into said cavity and said insertion hole.

6. The idle adjusting screw device as set forth in claim 5, wherein said carburetor body defines a horizontal throw port communicating with said insertion hole, a throw port plug is inserted in said throw port and defines an inclined surface constituting a portion of said insertion hole, said throw port plug defining a vertical channel communicating with said insertion hole and vertically aligned with said fuel passage thereabove, said vertical channel constituting an extended portion of said fuel passage.

* * * * *